United States Patent [19]

Alperovich et al.

[11] Patent Number: 6,138,002
[45] Date of Patent: Oct. 24, 2000

[54] SYSTEM AND METHOD FOR PROVIDING SERVICES BASED ON BROADCASTED SYSTEM INFORMATION

[75] Inventors: Vladimir Alperovich, Dallas; Ranjit Bhatia, Lewisville, both of Tex.

[73] Assignee: Ericsson Inc., Research Triangle Park, N.C.

[21] Appl. No.: 08/993,764

[22] Filed: Dec. 18, 1997

[51] Int. Cl.[7] .......................... H04M 11/00; H04Q 7/20; H04B 1/38
[52] U.S. Cl. .......................... 455/407; 455/517; 455/566
[58] Field of Search .................... 455/566, 517, 455/457, 158.4, 158.5, 38.4, 407, 406, 408, 419, 420

[56] References Cited

U.S. PATENT DOCUMENTS

| | | | |
|---|---|---|---|
| 5,233,642 | 8/1993 | Renton | 379/59 |
| 5,577,100 | 11/1996 | McGregor | 379/58 |
| 5,684,861 | 11/1997 | Lewis et al. | 379/59 |
| 5,706,330 | 1/1998 | Bufferd et al. | 379/58 |
| 5,835,856 | 11/1998 | Patel | 455/406 |
| 5,848,138 | 3/1999 | Sarpola et al. | 379/114 |
| 5,887,266 | 3/1999 | Heinonen et al. | 455/558 |

*Primary Examiner*—Fan Tsang
*Assistant Examiner*—Sheila Smith
*Attorney, Agent, or Firm*—Jenkens & Gilchrist, P.C.

[57] ABSTRACT

A telecommunications system and method for enabling a subscriber to determine the current time period, e.g., peak or off-peak, for that subscriber based upon the broadcasted system date and time prior to answering or placing a call on a mobile terminal. The Mobile Station (MS), or a Subscriber Identity Module (SIM) card within the MS, can be programmed with the relevant time periods for that subscriber, e.g., dates and hours for peak and off-peak time periods. In preferred embodiments of the present invention, a time period application within the SIM card receives the system information from the air interface and compares it with the stored time period information associated with the subscriber to determine the current time period. The SIM card can then instruct the MS to display the current time period, along with the amount of air time usage associated with that time period.

39 Claims, 4 Drawing Sheets

SYSTEM AND METHOD FOR PROVIDING SERVICES BASED ON BROADCASTED SYSTEM INFORMATION

BACKGROUND OF THE PRESENT INVENTION

Field of the Invention

The present invention relates generally to telecommunications systems and methods for determining the time period associated with a call placed to or from a mobile terminal, and specifically for enabling a subscriber to determine the time period, e.g., peak or off-peak, for a call placed to or from a mobile terminal, and the amount of air time usage associated with each time period.

BACKGROUND AND OBJECTS OF THE PRESENT INVENTION

Cellular telecommunications is one of the fastest growing and most demanding telecommunications applications ever. Today it represents a large and continuously increasing percentage of all new telephone subscriptions around the world. A standardization group, European Telecommunications Standards Institute (ETSI), was established in 1982 to formulate the specifications for the Global System for Mobile Communication (GSM) digital mobile cellular radio system.

With reference now to FIG. 1 of the drawings, there is illustrated a GSM Public Land Mobile Network (PLMN), such as cellular network 10, which in turn is composed of a plurality of areas 12, each with a Mobile Services Center (MSC) 14 and an integrated Visitor Location Register (VLR) 16 therein. The MSC/VLR areas 12, in turn, include a plurality of Location Areas (LA) 18, which are defined as that part of a given MSC/VLR area 12 in which a mobile station (MS) (terminal) 20 may move freely without having to send update location information to the MSC/VLR area 12 that controls the LA 18. Each Location Area 12 is divided into a number of cells 22. Mobile Station (MS) 20 is the physical equipment, e.g., a car phone or other portable phone, used by mobile subscribers to communicate with the cellular network 10, each other, and users outside the subscribed network, both wireline and wireless. The MS 20 may also include a Subscriber Identity Module (SIM) card 13, or other memory, which provides storage of subscriber related information, such as a subscriber authentication key, e.g., the International Mobile Subscriber Identity (IMSI) number, temporary network data, and service related data (e.g. language preference).

The MSC 14 is in communication with at least one Base Station Controller (BSC) 23, which, in turn, is in contact with at least one Base Transceiver Station (BTS) 24. The BTS is the physical equipment, illustrated for simplicity as a radio tower, that provides radio coverage to the geographical part of the cell 22 for which it is responsible. It should be understood that the BSC 23 may be connected to several base transceiver stations 24, and may be implemented as a stand-alone node or integrated with the MSC 14. In either event, the BSC 23 and BTS 24 components, as a whole, are generally referred to as a Base Station System (BSS) 25.

With further reference to FIG. 1, the PLMN Service Area or cellular network 10 includes a Home Location Register (HLR) 26, which is a database maintaining all subscriber information, e.g., user profiles, current location information, International Mobile Subscriber Identity (IMSI) numbers, and other administrative information. The HLR 26 may be co-located with a given MSC 14, integrated with the MSC 14, or alternatively can service multiple MSCs 14, the latter of which is illustrated in FIG. 1.

The VLR 16 is a database containing information about all of the Mobile Stations 20 currently located within the MSC/VLR area 12. If a MS 20 roams into a new MSC/VLR area 12, the VLR 16 connected to that MSC 14 will request data about that Mobile Station (terminal) 20 from the HLR database 26 (simultaneously informing the HLR 26 about the current location of the MS 20). Accordingly, if the user of the MS 20 then wants to make a call, the local VLR 16 will have the requisite identification information without having to reinterrogate the HLR 26. In the aforedescribed manner, the VLR and HLR databases 16 and 26, respectively, contain various subscriber information associated with a given MS 20.

The digital GSM system uses Time Division Multiple Access (TDMA) to handle radio traffic in each cell 22. TDMA divides each frequency (carrier) into eight time slots (physical channels). Logical channels are then mapped onto these physical channels. Examples of logical channels include traffic (speech) channels (TCH) and Control Channels (CCH).

Currently, many cellular subscriptions require the subscriber to pay a different rate depending on the time of a call placed to or from the MS 20, e.g., peak time or off-peak time. Furthermore, some subscriptions include free air time, for instance, 15 minutes of peak time and 100 minutes of off-peak time per month. However, the call counters included within each MS only count the number of calls, the duration of the last call, and the amount of air time usage for that call, but not the amount of air time usage for each time period during the current billing cycle. In addition, the MS 20 itself is not currently capable of indicating the time period prior to using the MS 20. Therefore, the subscriber does not, at present, have access to accurate information regarding the amount of air time usage per time period.

The only known method of determining the time period prior to answering or placing a call is for the subscriber to check the time, using, e.g., a watch or a clock. This presents a problem when the subscribers clock or watch displays a different time than the system time. For example, the subscribers watch may indicate 8:01, while the system time is only 7:59. If the off-peak time period does not begin until 8:00 system time, the subscriber will be charged for peak air time if the call is placed at 7:59 system time, regardless of the duration of the call.

It is therefore one object of the invention to enable a subscriber to determine whether the time period is peak or off-peak prior to answering or placing a call on a mobile terminal.

It is a further object of the invention to allow a subscriber access to accurate information regarding the amount of air time usage for a given time period.

SUMMARY OF THE INVENTION

The present invention is directed to telecommunications systems and methods for enabling accurate time dependent applications. For example, a subscriber can determine the system date and time and the associated time period, e.g., peak or off-peak, prior to answering or placing a call on a mobile terminal by broadcasting the system time and date over the air interface. The MS, or the SIM card within the MS, can be programmed with the relevant time periods for that subscriber, e.g., 7 a.m.–8 p.m. weekdays corresponds to the peak time period, while the rest of the time corresponds to the off-peak time period. Other information, such as a holiday indication, or time zone, may also be broadcast over the air interface. In preferred embodiments of the present invention, the SIM card receives the system (time and date) information from the air interface and compares it with the stored time period information associated with the subscriber to determine the current time period. The SIM card then instructs the MS to display the current time period. Thereafter, when a subscriber makes or receives a call, a set of call related counters for peak and off-peak time periods can be incremented based upon the duration of the call. These counters can also be re-set automatically when the next billing cycle begins based upon the broadcast time. Alternatively, the determination of peak or off-peak can be made by the serving Mobile Switching Center/Visitor Location Register (MSC/VLR) or Base Station Controller and then sent to the mobile terminal for display to the subscriber.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PRESENTLY PREFERRED EXEMPLARY EMBODIMENTS

The numerous innovative teachings of the present application will be described with particular reference to the presently preferred exemplary embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
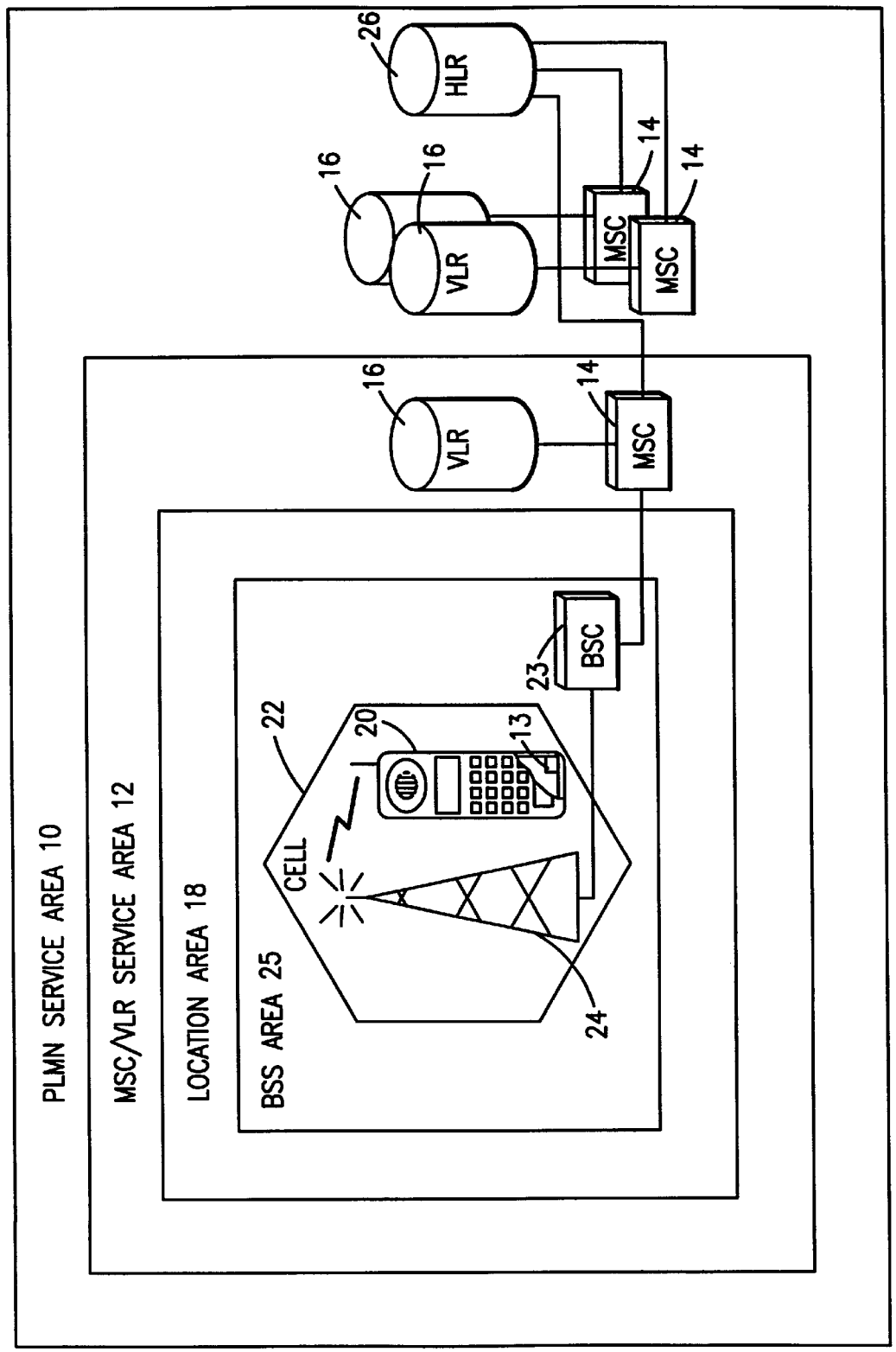
FIG. 1 is a block diagram of a conventional terrestrially-based wireless telecommunications system.
Figure 2:
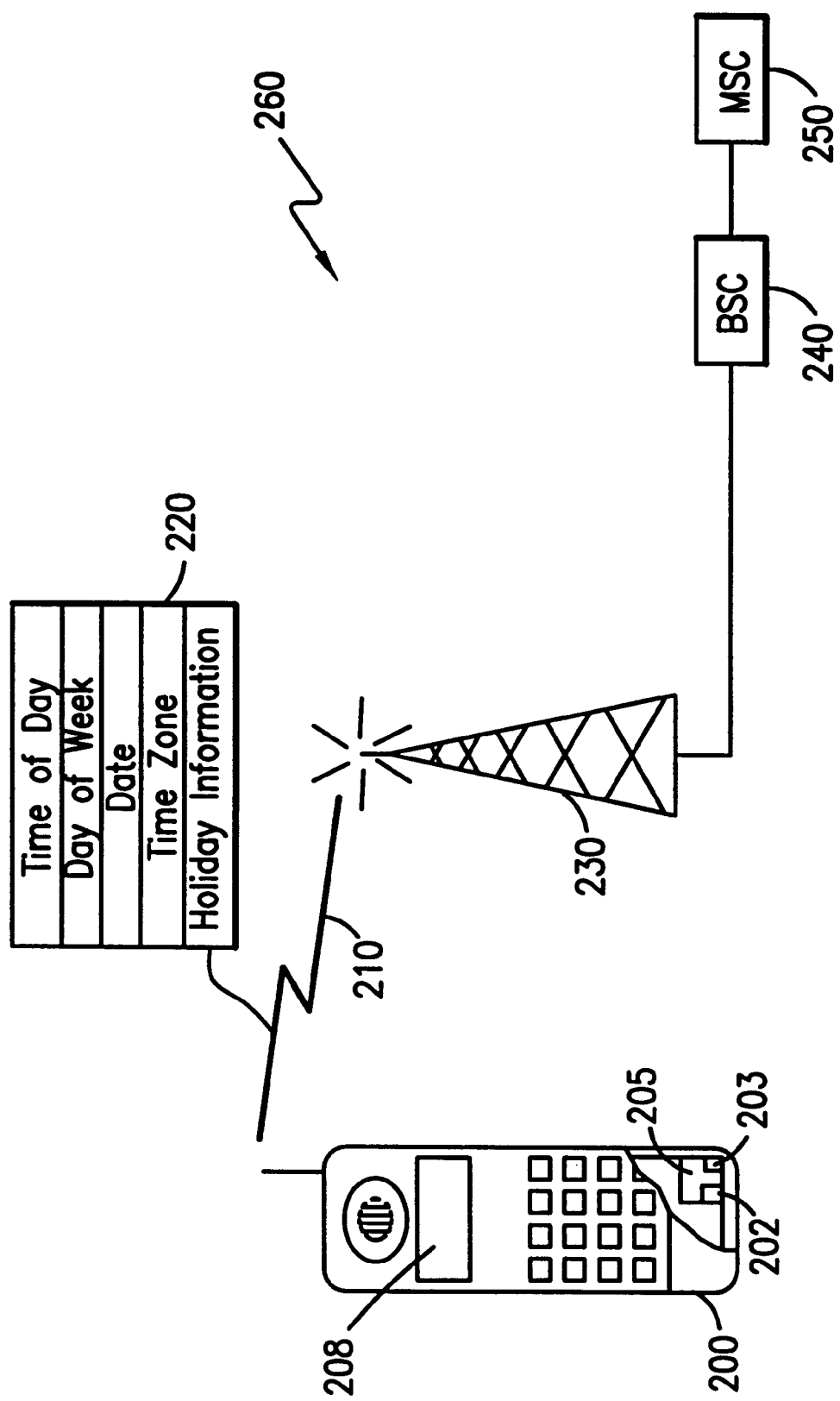
FIG. 2 illustrates the delivery of system information, e.g., a time stamp, day of the week, and any holiday related information, over a broadcast channel, to be received by a time period application within a mobile terminal.

With reference now to FIG. 2 of the drawings, system information 220, e.g., time of the day, day of the week, date, time zone, and an indication of whether the current day is a holiday, can be transmitted to a given mobile station (terminal) (MS) 200 from a Mobile Services Center (MSC) 250 via a Base Station Controller (BSC) 240 and Base Transceiver Station 230 over the air interface, to enable a subscriber to determine the relevant time period prior to answering or placing a call on that mobile station. For example, a control channel 210, such as a Broadcast Control Channel (BCCH) can be used in a GSM or PCS 1900 system. Alternatively, the system information can be sent using a Short Message System (SMS) broadcast channel (not shown). This system information can be broadcast constantly, or periodically, e.g., every five minutes.

The MS 200 includes within it a time period application 202 which retrieves this system information 220 and displays to the subscriber on a display 208 the current time period information. This time period application 202 can be a separate function, or can be implemented within a Subscriber Identity Module (SIM) 205, or other programmable memory, within the MS 200. In preferred embodiments of the present invention, the SIM card 205 is programmed with the relevant time period information 203, for example, as a database, for that subscriber, e.g., 7 a.m.–8 p.m. on weekdays corresponds to the peak time period, while any other time corresponds to the off-peak time period.

The time period application 202 in the SIM card 205 monitors the broadcast channel 210 for the system information 220, extracts this system information 220 from the broadcast channel 210, and compares the system information 220 with the stored time period information 203 to determine the current time period information. Based upon the results of this comparison, the time period application 202 within the SIM card 205 then instructs the MS 200 to display the current time and the current time period information to the subscriber on the MS display 208 constantly or, based on subscriber demands, prior to answering or placing a call. However, if the MS 200 is not within the home Public Land Mobile Network (PLMN) 260, roaming charges (instead of peak or off-peak charges) apply, and thus, the current time period will not be displayed to the subscriber.

Alternatively, the subscriber could program the MS 200 to display either the current time or the current time period information. In addition, if the broadcasted system information 220 includes the current time zone, the time corresponding to any other time zone can be calculated and displayed to the subscriber. Furthermore, if an indication of a holiday, and therefore, an off-peak time period, is transmitted to the MS 200, either the time period (off-peak) or the indication that the current day is a holiday can be displayed to the subscriber. Alternatively, the time period application 202 within the SIM card 205 can store the relevant holiday information, and make the determination of whether the current day is a holiday by comparing the broadcasted system date information 210 with the stored holiday information.

Figure 3:
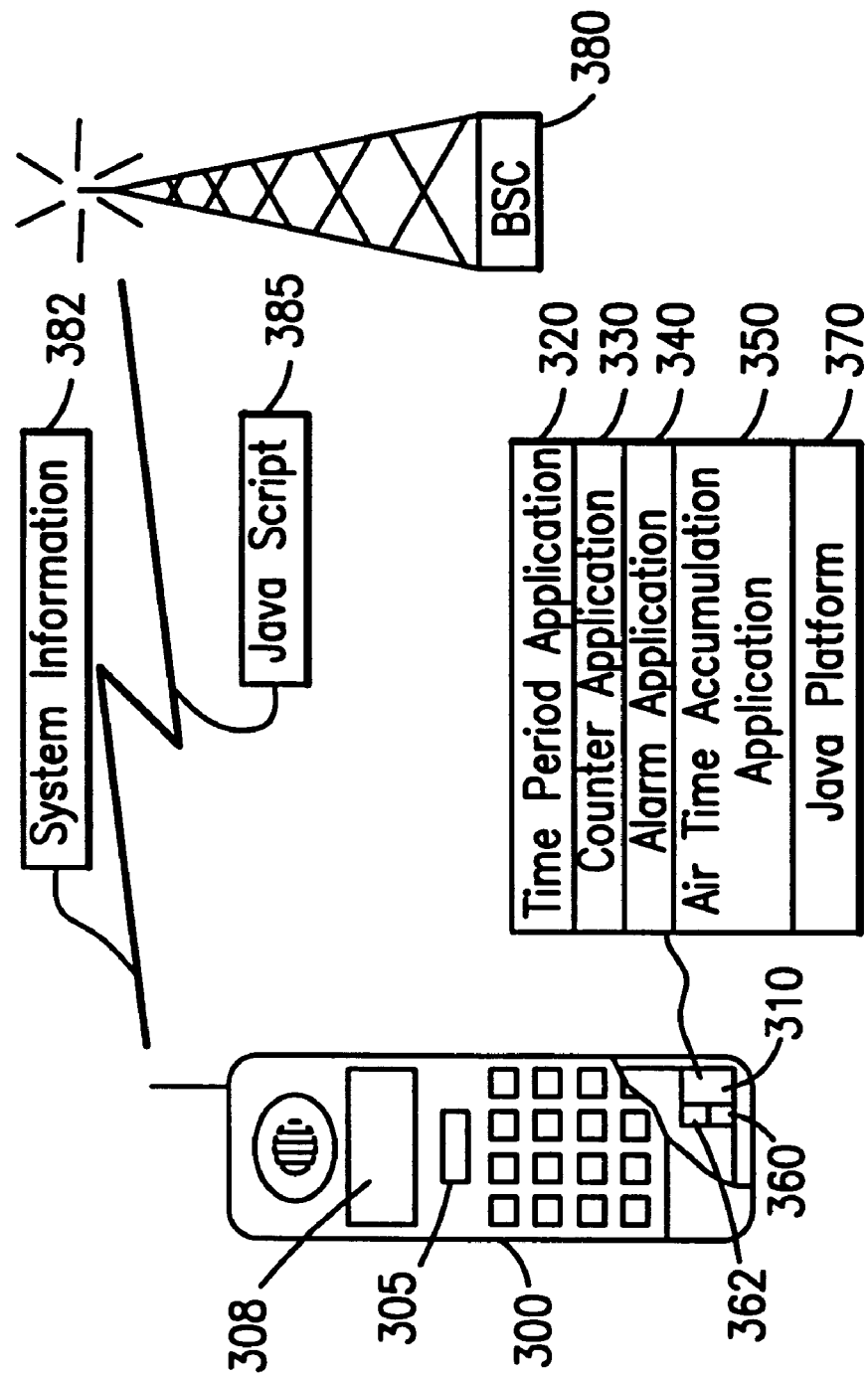
FIG. 3 shows the interrelationship between the time period application and various other applications, which use the time period information, within a Subscriber Identity Module (SIM) card, or other programmable memory within the mobile terminal.

Each time period (peak or off-peak) has a billing rate associated with it, and in many instances, a certain amount of time for each time period per month is allotted before the billing rate is applied. Therefore, not only does the subscriber need to know the current time period, but also the amount of accumulated air time usage during the billing cycle for that time period, e.g., peak or off-peak. Therefore, as shown in FIG. 3, within, for example, the SIM card 310, a counter application 330, which uses the extracted system information, can be used to calculate the accumulated air time usage for a given time period.

When a subscriber makes or receives a call on a MS 300, a set of call related counters 360 and 362 associated with the amount of air time usage for peak and off-peak time periods respectively are incremented based upon the duration of the call. This information can be presented to the subscriber on a MS display 308 prior to answering or placing a call and can be accessed at any time by the subscriber pressing a function key 305 on the MS 300 itself. The number of calls for each time period can also be displayed. In addition, each counter 360 and 362 (for peak and off-peak respectively) can be re-set automatically based upon the broadcast time 382. The SIM card 310, or other memory, preferably has the date each month that the new billing cycle begins stored therein, and when that date is broadcast with the system information 382, the counter application 330 within the SIM card 310 resets each counter 360 and 362 (for peak and off-peak respectively) to zero. In addition, the SIM card 310 can store the amount of accumulated air time usage for each time period per billing cycle for the past few billing cycles. Therefore, the subscriber can determine and compare the accumulated air time usage for the past few billing cycles.

In an alternative embodiment, instead of including the time period application 320 within the SIM card 310 itself, the SIM card 310 could include a JAVA platform 370, which allows the BSS 380 to send a JAVA script 385 containing the time period application 320 and counter application 330 to the MS 300, which can then be run on the SIM card 310. Advantageously, a subscriber can access accurate time period information without purchasing a new MS 300 that includes this time period feature.

Furthermore, the broadcasted system information received by the time period application 320 can include an air time accumulation indicator, which informs the subscriber of the method by which the cellular network accumulates air time. For example, in some cellular networks, the amount of air time usage is rounded off to the next minute, so that even if a subscriber talks for only ten seconds, the subscriber will be billed for one minute. Alternatively, in other cellular networks, the exact amount of air time usage (to the second) is used for billing purposes. This air time accumulation indicator can be used by the counter application 330 for correct incrementation of the exact amount of air time usage accumulated by the subscriber for that cellular network. An air time accumulation feature (application) 350 within the SIM card 310 can retrieve this broadcasted information and display it to the subscriber on the display 308 to inform the subscriber of the manner in which the cellular network tabulates the amount of air time usage.

Moreover, the system information obtained by the time period application 320 within the SIM card 310, or other programmable memory, can be used to establish the desired long-distance carrier for the current time period. For example, the subscriber could program the MS 300 to use AT&T during peak hours, but MCI during off-peak hours, to take advantage of the rates provided by each long-distance carrier.

Another feature shown in FIG. 3, which can be implemented using the time period application discussed herein, is an alarm feature (application) 340. The subscriber can program the alarm application 340 within the SIM card 310 to instruct the MS 300 to ring when the programmed date and time equals the broadcasted system date and time 382. Thus, the MS alarm feature 340 can serve as a wake-up call to the subscriber.

Figure 4:
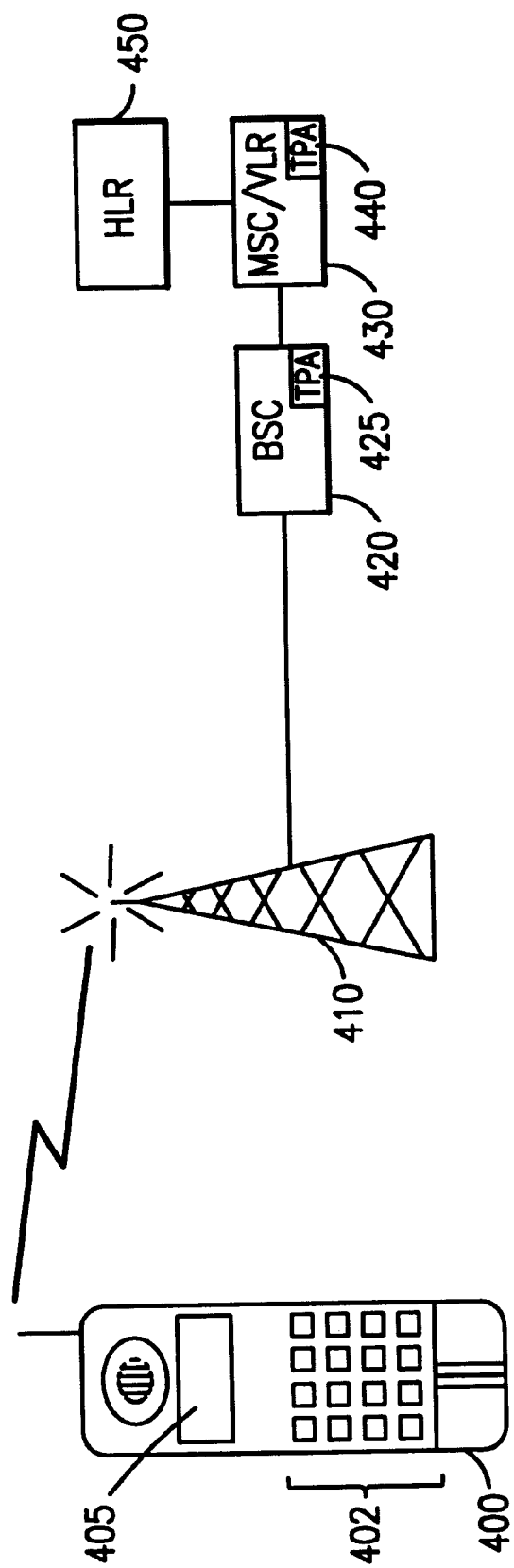
FIG. 4 demonstrates a sample implementation of the time period determination process of the present invention within the cellular network itself.

In an alternative embodiment, as indicated in FIG. 4 of the drawings, the time period application 440 or 425 can be located within the cellular network itself, for instance, within the Mobile Switching Center/Visitor Location Register (MSC/VLR) 430 or the Base Station Controller (BSC) 420, respectively. For example, the time period application 440 within the MSC/VLR 430 can obtain the relevant subscriber time period information, e.g., when peak and off-peak times begin, from the Home Location Register (HLR) 450, and compare the current system date and time with the subscriber time period information to determine whether the current time period is peak or off-peak. Thereafter, the current time period can be transmitted to the MS 400 via the Base Transceiver Station (BTS) 410, using, for example, an Unstructured Supplementary Service Data (USSD) message or Short Message Service (SMS) message, to be presented to the subscriber on the MS display 405. The current time period information can be transmitted continuously, at regular intervals, or alternatively, can be sent to the MS 400 after a request is received by the MSC/VLR 430 from the MS 400 for the current time period. For the latter, the subscriber could enter a service code, e.g., *xx, on the keypad 402 of the MS 400, instructing the MS 400 to send a message to the MSC/VLR 430 requesting the current time period.

As will be recognized by those skilled in the art, the innovative concepts described in the present application can be modified and varied over a wide range of applications. Accordingly, the scope of patented subject matter should not be limited to any of the specific exemplary teachings discussed.

For example, it should be noted that the broadcasted system information can be used to implement a variety of services and should not be limited to the aforedescribed services.

What is claimed is:

1. A telecommunications system for determining a current one of time period information for a given one of a plurality of mobile terminals in wireless communication with a mobile services center, said telecommunications system comprising:

a memory located within said telecommunications system for storing said time period information containing information on at least one peak or off peak time period associated with said given mobile terminal;

a base station system in wireless communication with said given mobile terminal and connected to said mobile services center, said base station system broadcasting system information identifying at least the current system time; and a time period application within said telecommunications system for receiving said broadcasted system information, comparing said time period information stored within said memory with said broadcasted system information and determining said current time period information for said given mobile terminal.

2. The telecommunications system of claim 1, wherein said memory and said time period application are located within said given mobile terminal.

3. The telecommunications system of claim 2, wherein said given mobile terminal comprises a display, said broadcasted system information including the time of day, said time period application instructing said given mobile terminal to display the time of day on said display.

4. The telecommunications system of claim 2, wherein said given mobile terminal comprises a display, said current time period information being displayed on said display.

5. The telecommunications system of claim 2, further comprising a counter application within said given mobile terminal, said counter application managing at least one counter within said given mobile terminal.

6. The telecommunications system of claim 5, wherein said counter application resets said at least one counter when said broadcasted system information equals a reset time stored within said memory, said reset time corresponding to the beginning of a current billing cycle.

7. The telecommunications system of claim 6, wherein said counter application increments said at least one counter based upon the amount of air time usage of said given mobile terminal.

8. The telecommunications system of claim 7, wherein said current time period information corresponds to a peak time period, said at least one counter corresponding to the amount of air time usage for said given mobile terminal during said peak time period for said current billing cycle, the amount of air time usage for said peak time being displayed on a display on said given mobile terminal.

9. The telecommunications system of claim 7, wherein said current time period information corresponds to an off-peak time period, said at least one counter corresponding to the amount of air time usage for said given mobile terminal during said off-peak time period for said current billing cycle, the amount of air time usage for said off-peak time period being displayed on a display on said given mobile terminal.

10. The telecommunications system of claim 1, wherein said broadcasted system information is selected from the group consisting of: the time of day, day of week, date, time zone, and holiday information.

11. The telecommunications system of claim 1, wherein said current time period information corresponds to a peak time period.

12. The telecommunications system of claim 1, wherein said current time period information corresponds to an off-peak time period.

13. The telecommunications system of claim 2, wherein said memory is a subscriber identity module, said time period application being implemented in said subscriber identity module.

14. The telecommunications system of claim 2, wherein said memory within said given mobile terminal has a JAVA platform stored therein, said base station system sending a JAVA script to said given mobile terminal to be implemented by said JAVA platform, said JAVA script containing said time period application.

15. The telecommunications system of claim 2, further comprising an alarm application within said given mobile terminal, said alarm application instructing said given mobile terminal to ring when a programmed time equals said broadcasted system information.

16. The telecommunications system of claim 2, further comprising an air time accumulation application within said given mobile terminal, said broadcasted system information including an air time accumulation indicator, said air time accumulation application receiving said air time accumulation indicator and instructing said given mobile terminal to display said air time accumulation indicator.

17. The telecommunications system of claim 1, wherein said broadcasted system information is sent by said base station system over a Broadcast Control Channel.

18. The telecommunications system of claim 1, further comprising a home location register connected to said mobile services center, said memory being located within said home location register.

19. The telecommunications system of claim 18, wherein said time period application is located within said mobile services center, said time period information being forwarded to said mobile services center from said home location register, said current time period information being sent to said base station system for transmittal of said current time period information to said given mobile terminal.

20. The telecommunications system of claim 18, wherein said time period application is located within said base station system, said time period information being forwarded to said base station system from said home location register via said mobile services center, said base station system transmitting said current time period information to said given mobile terminal.

21. A method for determining a current one of time period information for a given one of a plurality of mobile terminals in wireless communication with a mobile services center within a telecommunications system, said method comprising the steps of:

storing said time period information associated with said given mobile terminal within a memory located within said telecommunications system;

broadcasting system information, by a base station system in wireless communication with said given mobile terminal, said base station system being connected to said mobile services center;

receiving said broadcasted system information, by a time period application within said telecommunications system;

comparing, by said time period application, said broadcasted system information with said time period information stored within said memory; and determining, by said time period application, said current time period information based on said step of comparing.

22. The method of claim 21, wherein said memory and said time period application are located within said given mobile terminal.

23. The method of claim 22, wherein said broadcasted system information includes the time of day, and further comprising, after said step of determining, the step of:

displaying, using said time period application, the time of day on a display on said given mobile terminal.

24. The method of claim 22, further comprising, after said step of determining, the step of:

displaying, using said time period application, said current time period information on a display on said given mobile terminal.

25. The method of claim 22, further comprising, after said step of determining, the step of:

resetting at least one counter within said given mobile terminal, using a counter application within said given mobile terminal, when said broadcasted system information equals a reset time stored within said memory, said reset time corresponding to the beginning of a current billing cycle.

26. The method of claim 25, further comprising, after said step of resetting, the step of:

incrementing, using said counter application, said at least one counter based upon the amount of air time usage of said given mobile terminal.

27. The method of claim 26, wherein said current time period information corresponds to a peak time period, said at least one counter corresponding to the amount of air time usage for said given mobile terminal during said peak time period for said current billing cycle, and further comprising, after said step of incrementing, the step of:

displaying, on a display on said given mobile terminal, the amount of air time usage for said peak time period.

28. The method of claim 26, wherein said current time period information corresponds to an off-peak time period, said at least one counter corresponding to the amount of air time usage for said given mobile terminal during said off-peak time period for said current billing cycle, and further comprising, after said step of incrementing, the step of:

displaying, on a display on said given mobile terminal, the amount of air time usage for said off-peak time period.

29. The method of claim 21, wherein said broadcasted system information includes the time of day, day of week, date, time zone, and holiday information.

30. The method of claim 21, wherein said current time period information corresponds to a peak time period.

31. The method of claim 21, wherein said current time period information corresponds to an off-peak time period.

32. The method of claim 22, wherein said memory is a subscriber identity module, said time period application being implemented in said subscriber identity module.

33. The method of claim 22, wherein said memory within said given mobile terminal has a JAVA platform stored therein, and further comprising, before said step of receiving, the step of:

sending, by said base station system, a JAVA script to said given mobile terminal to be implemented by said JAVA platform, said JAVA script containing said time period application.

34. The method of claim 22, further comprising, after said step of determining, the step of:

instructing, by an alarm application within said given mobile terminal, said given mobile terminal to ring when a programmed time equals said broadcasted system information.

35. The method of claim 22, further comprising, after said step of determining, the step of:

instructing, by a call generator application within said given mobile terminal, said given mobile terminal to place a call to a predefined number when a programmed time equals said broadcasted system information.

36. The method of claim 21, wherein said step of broadcasting is performing by sending said broadcasted system information, by said base station system, over a Broadcast Control Channel.

37. The method of claim 21, wherein said memory is located within a home location register connected to said mobile services center.

38. The method of claim 37, wherein said time period application is located within said mobile services center, and further comprising, before said step of determining, the step of:

forwarding, by said home location register, said time period information to said mobile services center; and further comprising, after said step of determining, the steps of:

sending, by said mobile services center, said current time period information to said base station system; and transmitting, by said base station system, said current time period information to said given mobile terminal.

39. The method of claim 37, wherein said time period application is located within said base station system, and further comprising, before said step of determining, the step of:

forwarding, by said home location register, said time period information to said base station system via said mobile services center; and further comprising, after said step of determining, the step of:

transmitting, by said base station system, said current time period information to said given mobile terminal.

* * * * *

UNITED STATES PATENT AND TRADEMARK OFFICE
CERTIFICATE OF CORRECTION

PATENT NO : 6,138,002

DATED : October 24, 2000

INVENTOR(S) : Alperovich, et al.

It is certified that error appears in the above-identified patent and that said Letters Patent are hereby corrected as shown below:

Column 1, line 65   Replace "Internaticnal"
                       With --International--

Please amend the cover page of the patent as follows:

[56] References Cited: U.S. Patent Documents: Please add:--
5,655,218  08/05/97  Smolinske
5,684,861  11/04/97  Lewis, et al.
5,625,683  04/29/97  Nazanin, et al.

Foreign Patent Documents:
WO 94/28670 12/08/94 PCT
WO 98/52344 11/19/98 PCT
EP 0 734 144 A2 09/25/96 EPO
DE 196 02 718 A1 07/31/97 Germany

Other Documents:
PCT International Search Report dated April 12, 1999--

Signed and Sealed this

First Day of May, 2001

*Attest:*

NICHOLAS P. GODICI

*Attesting Officer*     *Acting Director of the United States Patent and Trademark Office*